United States Patent [19]

Alexander

[11] Patent Number: 5,104,417
[45] Date of Patent: Apr. 14, 1992

[54] SUBSTITUTE COAL FROM ACETYLENE PRODUCTION BY-PRODUCTS

[75] Inventor: Samuel R. Alexander, Bay St. Louis, Miss.

[73] Assignee: E. I. Du Pont de Nemours and Company, Wilmington, Del.

[21] Appl. No.: 552,218

[22] Filed: Jul. 13, 1990

[51] Int. Cl.$^5$ .............................................. C10L 1/32
[52] U.S. Cl. ...................................... 44/280; 44/568; 44/569; 44/593
[58] Field of Search ................. 44/280, 568, 569, 593; 585/539

[56] References Cited

U.S. PATENT DOCUMENTS

| | | | |
|---|---|---|---|
| 3,316,183 | 4/1967 | King et al. | 44/564 |
| 3,395,194 | 7/1968 | Keckler et al. | 585/539 |
| 3,692,862 | 9/1972 | Staud et al. | 585/539 |
| 3,764,547 | 10/1973 | Schlinger et al. | 44/280 |
| 3,878,087 | 4/1975 | Kawai et al. | 585/539 |
| 4,780,109 | 10/1988 | Malone et al. | 44/280 |

OTHER PUBLICATIONS

Thermal Detoxification of Acetylene Production Wastes at the Novgorod Industrial Corporation "Azot", Chem. Abstract 92 (18); 132 404X (1979), Dergachev et al.

Primary Examiner—Margaret Medley

[57] ABSTRACT

A coal substitute product and process for producing it from by-products formed in the production of acetylene from natural gas is disclosed. The first by-product is an aqueous slurry of soot which is mixed with the second by-product, an acetylene polymer. After mixing the material is filtered to produce a filter cake which is processed into chunks similar to coal in appearance, handling qualities and burning characteristics. Alternatively another carbonaceous tarry substance such as an asphaltenes or acryloid polymer waste can be substituted for the acetylene polymer.

8 Claims, No Drawings

SUBSTITUTE COAL FROM ACETYLENE PRODUCTION BY-PRODUCTS

FIELD OF THE INVENTION

The present invention relates to a process for forming a high quality fuel that serves as a substitute coal, which is formed from waste streams formed in the production of acetylene. The waste streams are a soot slurry and an acetylene polymer which are formed in the production of acetylene from natural gas by catalytic dehydrogenation.

BACKGROUND OF THE INVENTION

In thermal detoxification of acetylene production wastes at the Novgorod Industrial Corporation "Azot", Chem. Abstracts 92 (18); 132404x (1979), Dergachev et al. disclosed purifying acetylene during its production from natural gas to give wastewaters containing 3–5% suspended carbon. The wastewaters were mixed with kerosene to give a scum containing 27% carbon, 11% kerosene and 62% water. The scum was burned in a cyclone type furnace in a current of natural gas which furnace was normally fielded by natural gas and higher acetylenes formed as by-products in the product of acetylene.

SUMMARY OF THE INVENTION

The present invention involves blending an aqueous slurry of 0.2 to 5.0 wt % acetylene soot with acetylene polymer in a high shear mix tank. The resulting mixture is filtered by a membrane filter press or other suitable filter to provide a filter cake. The filter cake is processed through a delumper and screens to produce a product similar to commercial coal. The product can be used as is or blended with commercial coal for use as a furnace fuel in a conventional coal burning furnace.

Acetylene is often made on commercial scale using natural gas and oxygen. Generally the natural gas and oxygen are preheated to a temperature over about 600° C., mixed in a predetermined ratio and the natural gas pyrolyzed to form acetylene. At the pyrolysis temperatures encountered, the acetylene is unstable and, therefore, is quickly cooled. Even though the acetylene, as produced, remains at the pyrolysis temperature a very short time, before it is cooled with a water spray, a soot is formed some of which comes out with the water spray. This soot has a very high surface area and is the soot used in the present invention. Later in the process, the acetylene is refined with a solvent and an acetylene polymer is recovered from the solvent. This is the acetylene polymer preferred for use in the present invention.

DETAILED DESCRIPTION

The current commercial process for producing acetylene produces two by-products which must be disposed of. The first of these by-products is a soot consisting essentially of carbon, which is formed as an aqueous dispersion containing 0.2 to 5.0 wt % soot solids. Presently, the slurry is dewatered by filtration to produce a filter cake containing about 40 wt % solids. The filter cake presently is disposed of by landfilling. It is anticipated that this method of disposal will not be available within the next few years.

The second by-product produced in the production of acetylene is an acetylene polymer. The acetylene polymer is a major handling problem. The material will not flow under normal operating conditions. It must manually be packed into fiber drums and incinerated in those drums.

It has also been found that various materials similar to the acetylene polymer may be substituted therefor in the present invention. These materials may generally be described as tarry, sticky carbonaceous materials which generally have a boiling point above 1000° F (538° C.). Specific examples of such materials include acryloid polymer waste and petroleum asphaltenes.

It has now been found that the acetylene soot slurry acts as an excellent absorbant for the acetylene polymer and provides a non-tacky product. The acetylene polymer in turn acts as a binder for the soot to hold the soot together in chunks similar to coal in both handling and burning characteristics. The chunks handle easily without dusting. The product chunks can then be processed through normal coal handling equipment.

The process generally involves adding an aqueous slurry of the soot slurry containing 0.2 to 5.0 wt % soot solids to a mix tank at ambient temperature, although temperatures of 10 to 90° C. can be used. Generally the mix tank should provide a high shear. The acetylene polymer or other carbonaceous tarry material is added to the mix tank at 10 to 90° C. and the resultant composition thoroughly mixed. The mix produced is filtered through a membrane filter having openings from 1 to 5 microns to produce a filter cake containing 40 to 70 wt % solids and preferably 60 to 65 wt % solids.

The filter cake is processed through a delumper to give chunks 0.25 inch to 1 inch (0.6 to 2.5 cm) in diameter preferably with less than 10 wt % of the product having a diameter less than 0.25 inch (0.6 cm) in diameter.

The product is resistant to agglomerating on storage and is resistant to forming dust during normal handling.

Generally the product has a heating value of 12,000 to 16,000 BTU/LB ($2.8 \times 10^7$ to $3.7 \times 10^7$ joule per kilogram) on a dry basis and 8,000 to 11,000 BTU/LB ($1.86 \times 10^7$ to $2.56 \times 10^7$ joule per kilogram) on the wet basis as the filter cake is recovered. If desired, the moisture content of the product can be reduced to 1.0 to 5.0 wt % by thermal drying.

Generally the ash content of the product is from 0.2 to 1.5 wt % with 0.5 to 0.8 being the preferred ash content. The sulfur content of the product is generally 0.01 to 0.06 wt % (solids basis).

Generally the weight ratio of acetylene soot solids to acetylene polymer in the product should be from 2:1 to 20:1. Below 2:1 the product can become sticky, while above 20:1 dusting can become a problem. The preferred ratio is about 6:1.

EXAMPLE

Five thousand gallons (18.9 m$^3$) of aqueous acetylene soot slurry containing 3 wt % acetylene soot solids are added to a high shear type mix tank. Four hundred pounds (182 kg) of acetylene polymer at 30° C. was added and mixed for 30 minutes at which time the acetylene polymer and acetylene soot were mixed thoroughly. The mixture was filtered in a membrane filter press at 200 pounds per square inch (1379 kPa) squeeze pressure to provide a filter cake. The filter cake was processed through a delumper and screens to give chunks 0.25 inch to 1 inch (0.6 to 2.54 cm) diameter. The final product looked and handled like coal and on a dry basis had the following analysis:

Heating value—15600 BTU/LB ($3.63 \times 10^7$ joule per kilogram)

Moisture—40%

Ash Content—0.7%

Sulfur Content—0.04%

The particle size distribution of the soot was analyzed over two determinations as a function of cummulative percentage of material which is summarized in Table I below.

TABLE I

| Average Diameter Microns | Cummulative % | Incremental % |
| --- | --- | --- |
| 15.0 | 0 | — |
| 10.0 | 7.2 | 7.2 |
| 8.0 | 11.8 | 4.6 |
| 6.0 | 14.8 | 3.0 |
| 5.0 | 16.7 | 1.9 |
| 4.0 | 19.7 | 3.0 |
| 3.0 | 24.8 | 5.1 |
| 2.0 | 32.3 | 7.5 |
| 1.0 | 51.0 | 8.7 |
| 0.8 | 59.3 | 8.3 |
| 0.6 | 70.4 | 10.1 |
| 0.5 | 77.5 | 7.1 |
| 0.4 | 85.3 | 7.8 |

The ash content of the fuel produced above (invention) was compared with that of a common stoker coal which had an ash content of 6.45 wt % and is reported in Table II below.

TABLE II

| Major Ash Elements | Invention wt % | Stoker Coal wt % |
| --- | --- | --- |
| $SiO_2$ | 31.76 | 43.75 |
| $Al_2O_3$ | 6.15 | 18.87 |
| $TiO_2$ | 0.37 | 1.04 |
| $Fe_2O_3$ | 14.97 | 31.01 |
| CsO | 16.06 | 1.31 |
| MgO | 1.65 | 0.70 |
| $Na_2O$ | 8.73 | 0.24 |
| $K_2O$ | 1.02 | 1.94 |
| $P_2O_5$ | 1.68 | 0.13 |
| $SO_3$ | 17.11 | 1.10 |

Thus the product of the invention is entirely suitable for use as a coal substitute. It is preferred, however, to blend the product of the invention with the coal normally used in a given furnace when using such product of the invention in a such furnace.

What is claimed:

1. A process for producing a coal-like product comprising thoroughly mixing an aqueous mixture containing from 0.2 to 5.0 wt % of a soot formed as a by-product in the formation of acetylene from natural gas and oxygen to which has been added a tarry carbonaceous material, the weight ratio of acetylene soot to tarry carbonaceous material being from 2:1 to 20:1, filtering the resulting aqueous mixture to provide a filter cake having a solids content of from 40 to 70 wt %.

2. The process of claim 1 wherein the tarry carbonaceous material is a polymer by-product produced in the production of acetylene from natural gas and oxygen.

3. The process of claim 2 wherein the filter cake is processed into a product having a predominant particle size of from 0.25 to 1 inch.

4. The process of claim 3 wherein the filter cake contains from 60 to 65 wt % solids.

5. A coal-like product comprising a mixture of 40 to 70 wt % solids consisting of soot formed as a by-product in the formation of acetylene from natural gas and oxygen and a tarry carbonaceous material, the weight ratio of acetylene soot to tarry carbonaceous material being from 2:1 to 20:1 and from 30 to 60 wt % water.

6. The product of claim 5 wherein the tarry carbonaceous material is a polymer produced in the production of acetylene from natural gas and oxygen.

7. The product of claim 6 wherein the particle size of the product is predominantly from 0.25 to 1 inch.

8. The product of claim 7 wherein the product contains from 60 to 65 wt % solids and 35 to 40 wt % water.

* * * * *